United States Patent
Lee et al.

(10) Patent No.: US 7,768,390 B2
(45) Date of Patent: Aug. 3, 2010

(54) METHOD FOR TRANSMITTING SENSOR DATA IN SENSOR NETWORK INCLUDING PAIR NODE

(75) Inventors: Kyong-Hee Lee, Daejon (KR); Jae-Hong Ruy, Daejon (KR); Bong-Soo Kim, Daejon (KR); Cheol-Sig Pyo, Daejon (KR)

(73) Assignee: Electronics and Telecommunications Research Institute (KR)

( * ) Notice: Subject to any disclaimer, the term of this patent is extended or adjusted under 35 U.S.C. 154(b) by 407 days.

(21) Appl. No.: 11/977,548

(22) Filed: Oct. 24, 2007

(65) Prior Publication Data

US 2008/0136620 A1 Jun. 12, 2008

(30) Foreign Application Priority Data

Dec. 8, 2006 (KR) .................. 10-2006-0125120

(51) Int. Cl.
*G08B 1/00* (2006.01)
*H04Q 1/30* (2006.01)
(52) U.S. Cl. .............. 340/531; 340/539.1; 340/3.52
(58) Field of Classification Search ............ 340/531
See application file for complete search history.

(56) References Cited

U.S. PATENT DOCUMENTS 6,414,955 B1 * 7/2002 Clare et al. .................. 370/390

7,630,336 B2 * 12/2009 Ganesh .................. 370/328

FOREIGN PATENT DOCUMENTS

| KR | 10-1990-0701112 A | 8/1990 |
| KR | 1020050068326 A | 7/2005 |
| KR | 1020060058975 A | 6/2006 |

* cited by examiner

*Primary Examiner*—Donnie L Crosland
(74) *Attorney, Agent, or Firm*—Blakely, Sokoloff, Taylor & Zafman

(57) ABSTRACT

Provided is a method for transmitting sensing information in a wireless sensor network including a pair node. The method for transmitting sensing information in a wireless sensor network including a sink node, parent nodes, and sensor nodes set as pair nodes among sensor nodes connected to the parent nodes, includes the steps of: a) setting up predetermined sensor nodes in the same target area as pair nodes for transmitting and receiving sensing information to/from corresponding sensor nodes; b) at the pair nodes, transmitting first sensing information sensed by oneself to corresponding sensor nodes; c) at the sensor nodes, transmitting first sensing information sensed by oneself and second sensing information transmitted from corresponding pair nodes to the parent node; and d) at the parent node, transmitting the received first and second sensing information to the sink node at the same time.

9 Claims, 6 Drawing Sheets

METHOD FOR TRANSMITTING SENSOR DATA IN SENSOR NETWORK INCLUDING PAIR NODE

CROSS-REFERENCE(S) TO RELATED APPLICATIONS

The present invention claims priority of Korean Patent Application No. 10-2006-0125120, filed on Dec. 8, 2006, which is incorporated herein by reference.

BACKGROUND OF THE INVENTION

1. Field of the Invention

The present invention relates to a method for transmitting sensing information in a wireless sensor network including a pair node; and, more particularly, to a method for transmitting sensing information in a wireless sensor network including a pair node by enabling each of a sensor node and a pair node, which are in the same target area and collect the same information, to transmit/receive the sensed information to/from each other.

This work was supported by the IT R&D program for MIC/IITA. [2005-S-101-02, "Development of UHF RF-ID and Ubiquitous Networking Technology"].

2. Description of Related Art

A pair node is a node that operates identically to a sensor node in the same target area. The pair node senses or collects the same information sensed or collected by the sensor node at the same time. The pair node and the sensor node transmit and receive the sensed information to/from each other. Therefore, the pair node can store both of information sensed by the pair node and the sensor node. Also, the sensor node can store both of information sensed by the sensor node and the pair node.

FIG. 1 is a diagram illustrating the transmission of sensing information in a wireless sensor network according to the related art.

As shown in FIG. 1, the wireless sensor network according to the related art includes sensor nodes 101, 102, 103, 104, and 105, parent nodes 106 and 107, and a sink node 108.

The sensor nodes 101 to 105 transmit the sensing information a1, a2, a3, a4, and a5 to the sink node 108 through the parent nodes 105 and 106. The parent nodes 106 and 107 may also have a function of sensing information.

The information stored in the sensor nodes 101 to 105 include node information including identification ID, PAN ID, and power source information, sensor information including a sensor type and a sensor ID, sensing information such as values that are obtained through sensing, and alarming information that is transmitted when a threshold value exceeds under predetermined conditions.

When a wireless sensor network is formed in a tree structure, the sensor nodes insert the above described information into a message having a predetermined format and transmit the message to an upper level node such as the parent nodes. The sensor nodes do not directly communicate with neighbor nodes having the same parent nodes. Thus, the sensor nodes have no information about neighbor nodes.

In case of using sensor nodes of a tree structured wireless sensor network in an indoor space, the indoor space does not have many obstacle factors for sensor nodes. However, sensor modules and communication modules of the sensor nodes may have many difficulties due to the physical and electric conditions of the outdoor space if the sensor nodes are used in an outdoor space.

FIG. 2 is a diagram illustrating the determination of difficulty in a wireless sensor network according to the related art.

As shown in FIG. 2, a sink node 208 receives sensing information b2' and b5' having error from sensor nodes 202 and 205 when sensor nodes 202 and 205 are having difficulties in a wireless sensor network according to the related art. That is, the sink node 208 determines that the sensor nodes 202 and 205 have difficulties based on the error in the received sensing information b2' and b5' from the sensor nodes 202 and 205.

The sink node could not receive the sensing information b2' and b5' having error if the sensor nodes 202 and 205 have difficulty to transmit the sensing information b2' and b5' to the parent nodes 206 and 207. In this case, the sink node could not determine that the sensor nodes have difficulties.

If a sensor node having the difficulty is separated far away from a user or is in a location where a user cannot reach easily, it is difficult to repair, manage, and replace the sensor node.

Since chips forming a sensor node have limited state information of the sensor node to provide, it is required to add additional routine or circuitry to detect the difficulty of the sensor node. Such additional routine and circuitry make the wireless sensor network having the sensor node complicated and also create additional cost. Therefore, it is not an effective way to determine the difficulty of the sensor node.

SUMMARY OF THE INVENTION

An embodiment of the present invention is directed to providing to a method for transmitting sensing information in a wireless sensor network including a pair node in order to transmit sensing information of a sensor node and a pair node together to a parent node by enabling each of the sensor node and the pair node, which are in the same target area and collect the same information, to transmit/receive the sensed information to/from each other.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a method for transmitting sensing information in a wireless sensor network including a sink node, parent nodes, and sensor nodes set as pair nodes among sensor nodes connected to the parent nodes, including the steps of: a) setting up predetermined sensor nodes in the same target area as pair nodes for transmitting and receiving sensing information to/from corresponding sensor nodes; b) at the pair nodes, transmitting first sensing information sensed by oneself to corresponding sensor nodes; c) at the sensor nodes, transmitting first sensing information sensed by oneself and second sensing information transmitted from corresponding pair nodes to the parent node; and d) at the parent node, transmitting the received first and second sensing information to the sink node at the same time.

The method may further include the step of: e) at the sink node, comparing the first sensing information and the second sensing information, which are transmitted from the pair nodes, and determining that a predetermined sensor node has difficulty if the first sensing information is different from the second sensing information.

In the step a), the sensor nodes may share information about corresponding pair nodes.

In the step b), the sensor nodes may transmit first sensing information sensed by oneself to the corresponding pair nodes through the parent node.

In the step b), the sensor nodes may add a field for indicating a destination of the first sensing information in order to transmit the first sensing information to the corresponding pair node through the parent node.

In the step b), the sensor nodes may transmit the first sensing information to corresponding pair nodes through infrared ray based communication.

DESCRIPTION OF SPECIFIC EMBODIMENTS

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

In an embodiment of the present invention, it is described that a sensor node has a pair node. However, the present invention is not limited thereto. A sensor node may have more than two of pair nodes.

Figure 1:
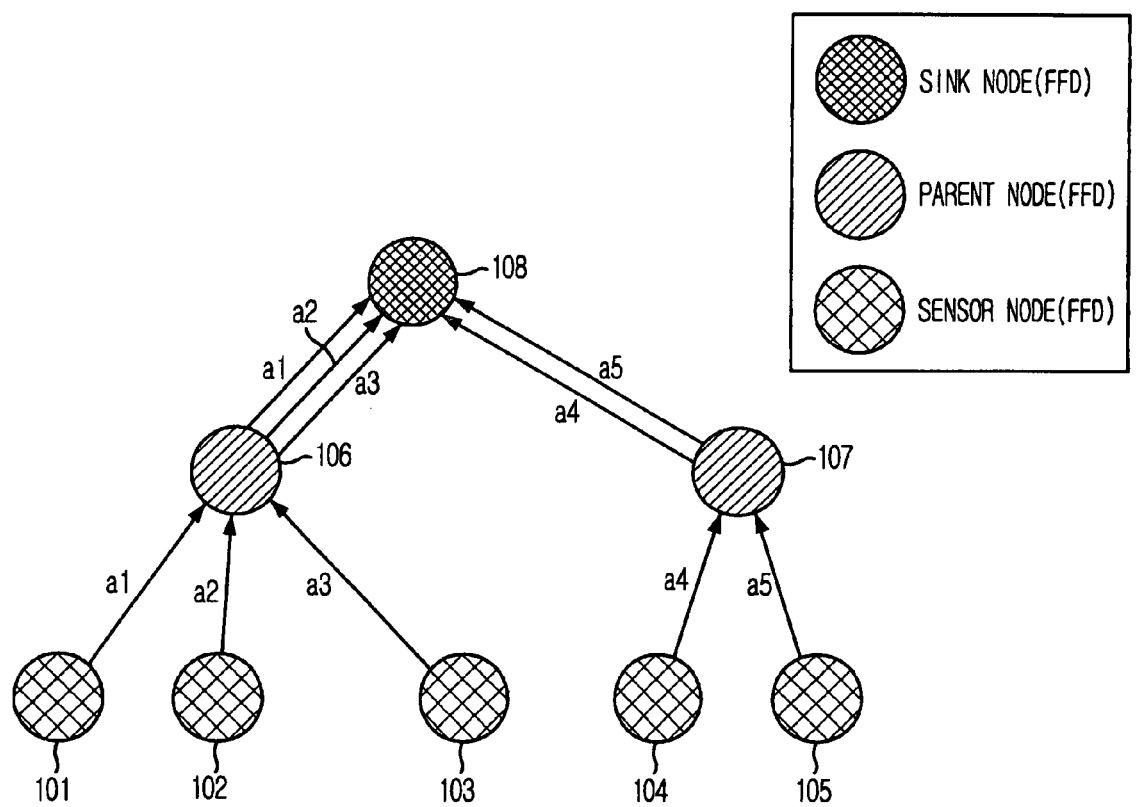
FIG. 1 is a diagram illustrating the transmission of sensing information in a wireless sensor network according to the related art.
Figure 2:
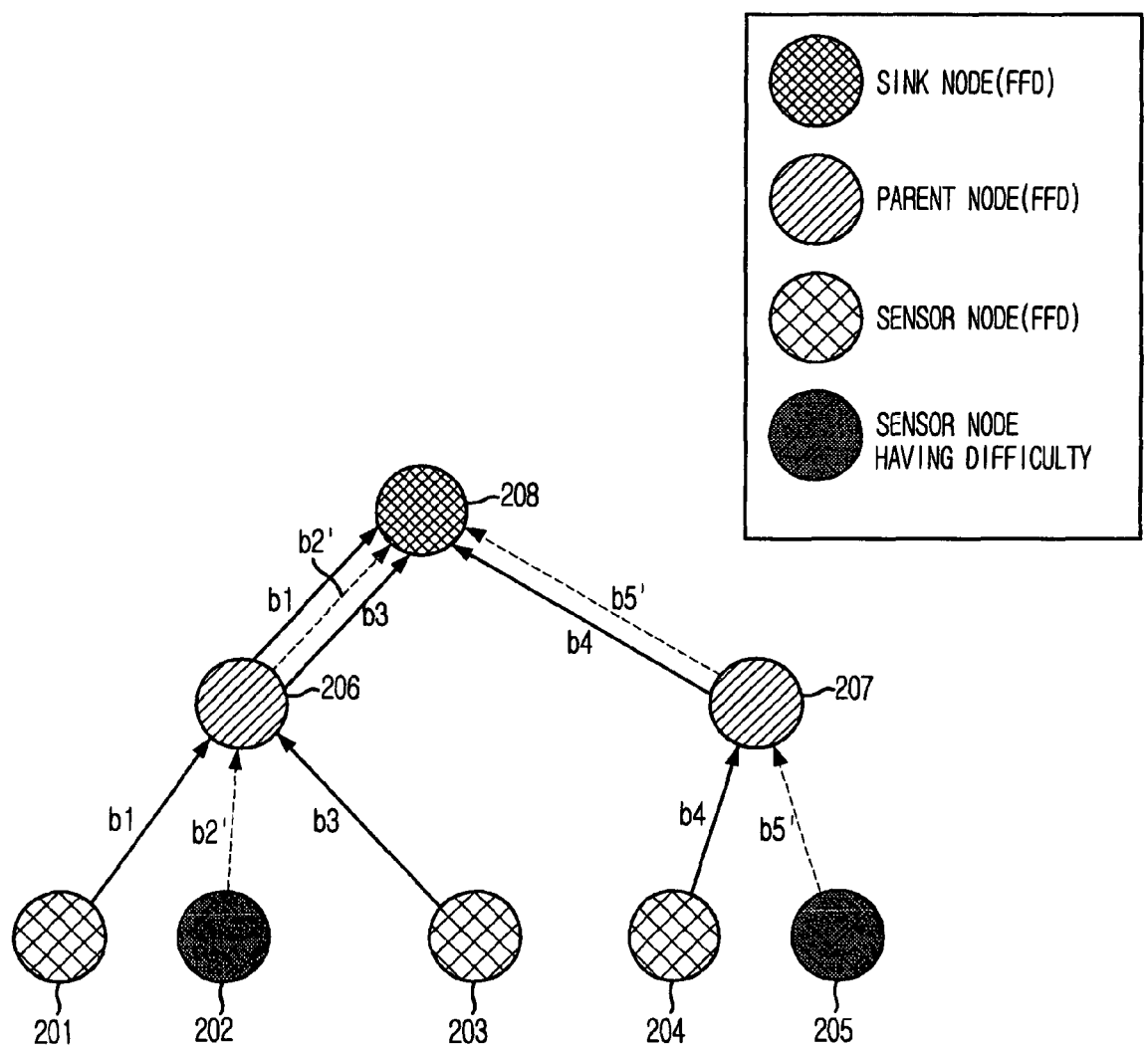
FIG. 2 is a diagram illustrating the determination of the difficulties of a wireless sensor network according to the related art.
Figure 3:
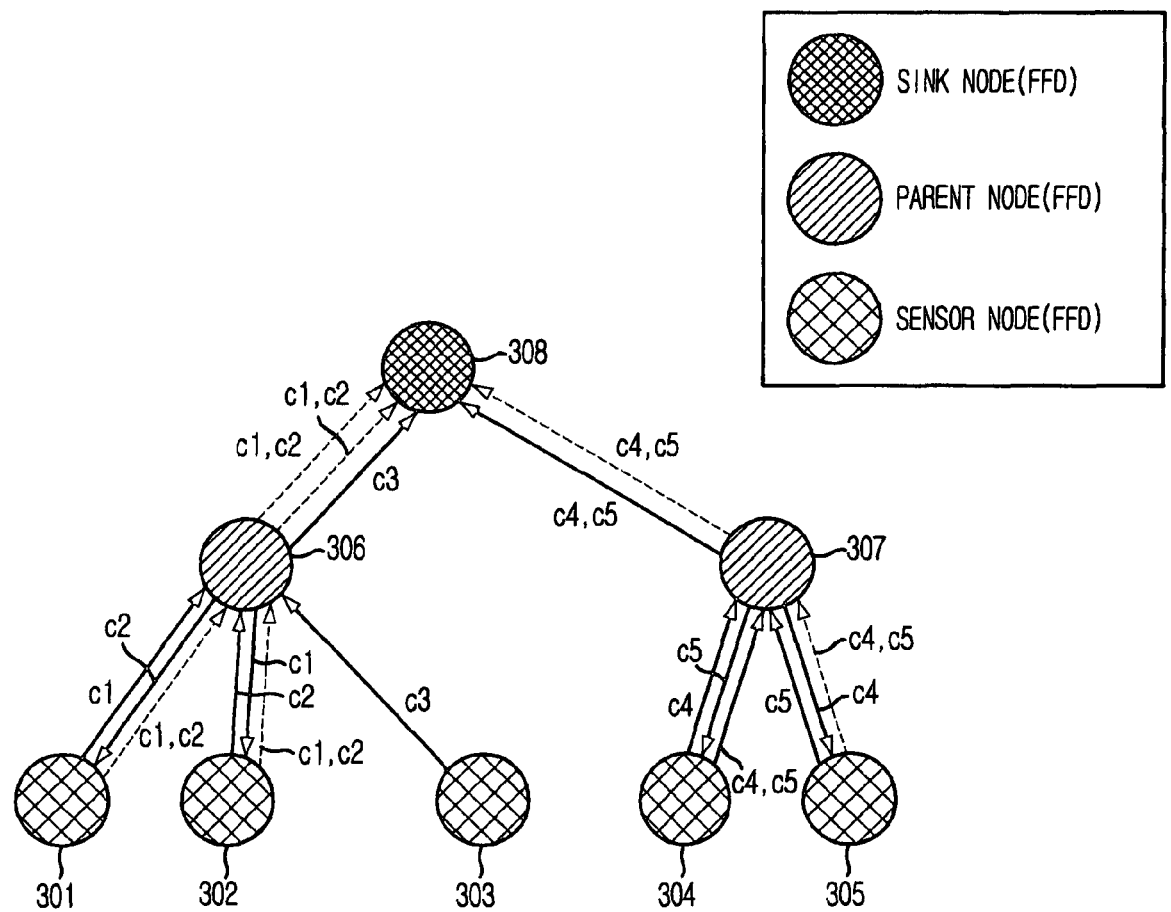
FIG. 3 is a diagram illustrating the transmission of sensing information in a wireless sensor network including a pair node in accordance with an embodiment of the present invention.

FIG. 3 is a diagram illustrating the transmission of sensing information in a wireless sensor network including a pair node in accordance with an embodiment of the present invention.

As shown in FIG. 3, the wireless sensor network including a pair node according to the present embodiment includes sensor nodes 301 to 305, parent nodes 306 and 307, and a sink node 308.

The second sensor node 302 is a pair node of the first sensor node 301. The fifth node 305 is a pair node of the fourth node 304. The third sensor node 303 does not have a corresponding pair node.

The first sensor node 301 senses or collects fist information and transmits the collected first sensing information c1 to a corresponding pair node, which is the second sensor node 302, through the first parent node 306. At the same time, the second sensor node 302 senses or collects second information c2 and transmits the collected second sensing information c2 to the first sensor node 301 through the first parent node 306.

The first sensor node 301 transmits the first sensing information c1 sensed by oneself and the second sensing information c2 sensed by the second sensor node 302 to the first parent node 306. At the same time, the second sensor node 302 transmits the second sensing information c2 sensed by oneself and the first sensing information c1 sensed by the second sensor node 302 to the first parent node 306.

The third sensor node 303 senses or collects third information C3 and transmits the collected third sensing information C3 to the first parent node 306. Since the third sensor has no corresponding pair node, the third sensor transmits only the third sensing information sensed by oneself to the parent node 306.

The first parent node 306 transmits the first and second information c1 and c2 received from the first and second sensor nodes 301 and 302 to the sink node 308. Also, the first parent node 306 transmits the third sensing information c3 to the parent node 306.

The fourth sensor node 304 transmits the fourth sensing information C4 which is sensed by oneself and the fifth sensing information C5 sensed by the fifth sensor node 305 to the second parent node 307. At the same time, the fifth sensor node 305 transmits the fifth sensing information c5 sensed by oneself and the fourth sensing information C4 sensed by the fourth sensor node 304 to the second parent node 307.

The fourth sensor node 304 transmits the fourth sensing information c4 sensed by oneself and the fifth sensing information c5 sensed by the fifth sensor node 305 to the second parent node 307. At the same time, the fifth sensor node 305 transmits the fifth sensing information c5 sensed by oneself and the fourth sensing information c4 sensed by the fourth sensor node 304 to the second parent node 307.

The second parent node 307 transmits the fourth and fifth information c4 and c5 from the fourth and fifth sensor nodes 304 and 305 to the sink node 308.

The first sensor node 301 or the second sensor node 302, the third sensor node 303, and the fourth sensor node 304 or the fifth sensor node 305 may sense information at the same time, regardless of an order of describing the sensor nodes.

However, the times of sensing information at the first and second nodes 301 and 302 must be the same, and the information sensed by the first and second nodes 301 and 302 must be the same because the second node 302 is the pair node of the first sensor node 301.

Also, the first sensor node 301 and the second sensor node 302 must transmit the first or the second sensing information c1 or c2 at the same time to corresponding one of the first and second sensor nodes 301 and 302 through the first parent node 306. Also, the first sensor node 301 and the second sensor node 302 transmit the first and second sensing information c1 and c2 to the first parent node 306 at the same time.

Since the fifth sensor node 305 is the pair node of the fourth sensor node 304, the information sensed by the fourth and fifth sensor nodes 304 and 305 must be the same, and the times of sensing the information at the fourth and fifth sensor nodes 304 and 305 must be the same.

Also, the fourth sensor node 304 and the fifth sensor node 305 must transmit the sensing information c4 or c5 to the fifth sensor node 305 and the fourth sensor node 304 at the same time. The fourth sensor node 304 and the fifth sensor node 305 must transmit the sensing information c4 or c5 to the second parent node 304 at the same time too.

The third sensor node 303, which does not have a pair node, uses an initially setup message format of a wireless sensor network when the third sensor node 303 transmits the third sensing information c3 to the first parent node 306.

However, the first sensor node 301 or the second sensor node 302 need a message packet having larger capacity than that of the initially setup message format when the first sensor node 301 or the second sensor node 302 transmits the sensing information c1 and c2 to the first parent node 306. The first sensor node 301 or the second sensor node 302 adds predetermined bytes to the initially setup message format to transmit the sensing information c1 and c2 or c4 and c5.

A message format used by the first sensor node 301 to transmit the first sensing information c1 to the first parent node 306 may be different from a message format used by the first sensor node 301 to transmit the second sensing information C2 sensed by the second sensor node 302 with the first sensor node c1 to the first parent node 306.

It is because the first parent node 306 must have a capability to select one of the second sensor node 302 and the sink node 308 to transmit the first sensing information c1 or the first and second sensing information c1 and c2 received from the first sensor node 301. For example, the first parent node 306 selects the second sensor node 302 if the first parent node 306 receives the first sensing information c1 only. The sink node selects the sink node 308 if the first parent node 306 receives the first and second sensing information c1 and c2 together.

Hereinafter, the message format used by the first sensor node 301 to transmit the sensing information to the first parent node 306 will be described. Following Table 1 shows the message format used by the first sensor node 301 to transmit the sensing information to the first parent node 306. As shown, the message format includes a sensing information field 1 for storing sensing information c1 sensed by the first sensor node 301, a sensor node ID field 2 for information about the first sensor node 301 such as ID, a destination node ID field 3 for information about a destination node of a message packet such as the ID of the second sensor node 302, and a digital value field having a digital value '0' for enabling the first parent node 306 to recognize the destination node of a message packet.

The digital value field 4 includes 0 for indicating that the first sensor node 301 transmits only the first sensing information c1 to the first parent node 306.

TABLE 1

| 0(4) | Destination node ID (3) | Sensor node ID (2) | Sensing information (1) |
|---|---|---|---|

Following Table 2 shows a message format used by the first sensor node 301 to transmit the second sensing information c2, which is sensed by a corresponding pair node that is the second sensor node 302, with the first sensing information c1 to the first parent node 306. As shown, the message format includes a sensing information field 5 for storing the first sensing information C1 sensed by the first sensor node 301 and the second sensing information c2 sensed by the second sensor node 302, a sensor node ID field 6 for information about the first sensor node 301 such as ID, a destination node ID field 7 for information about a destination node of a message packet such as the ID of the sink node 308, and a digital value field 8 having a digital value '1' for enabling the first parent node 306 to recognize the destination node of a message packet.

The digital value field 8 has a value of 1 for indicating that the first sensor node 301 transmits the second sensing information c2 sensed by the second sensor node 302 with the first sensing information to the first parent node 306.

TABLE 2

| 0(8) | Destination node ID (7) | Sensor node ID (6) | Sensing information (5) |
|---|---|---|---|

The first parent node 306 recognizes the destination node of the message packet through the digital value in the digital value field of the message format and transmits the received message packet to the corresponding destination node.

Since the digital value is exemplary decided for clearly describing the message format according to the present embodiment, it is obvious to those skilled in the art that the digital value may vary.

Furthermore, the message format according to the present embodiment is only an example. Therefore, it is also obvious to those skilled in the art that the present invention is not limited thereto, and that various message formats may be used.

Message formats used by the second sensor node 302, the fourth sensor node 304, and the fifth sensor node 305 may identical to the message format used by the first sensor node 301.

Figure 4:
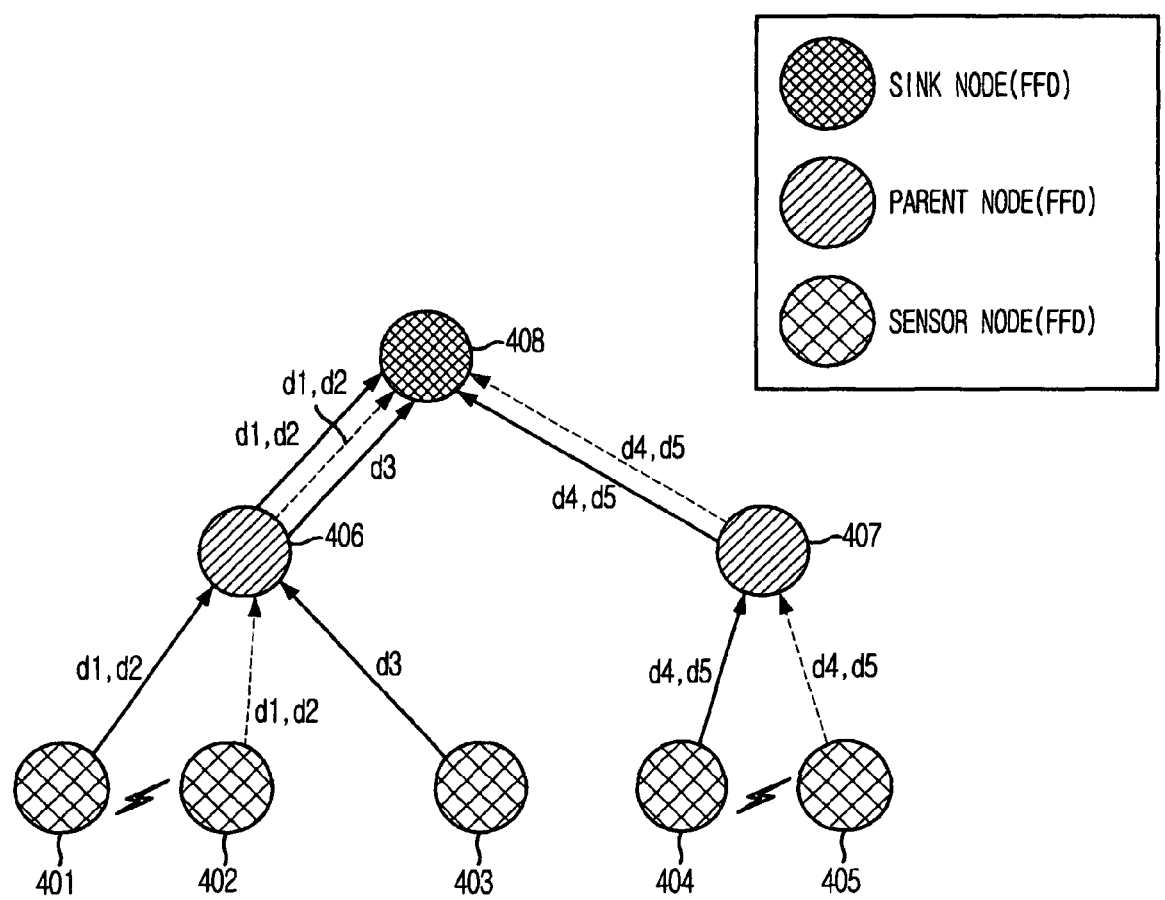
FIG. 4 is a diagram illustrating the collection of sensing information in a wireless sensor network including a pair node in accordance with an embodiment of the present invention.

FIG. 4 is a diagram illustrating the collection of sensing information in a wireless sensor network including a pair node in accordance with an embodiment of the present invention As shown in FIG. 4, the wireless sensor network having a pair node includes sensor nodes 401 to 405, parent nodes 406 and 407, and a sink node 408.

The second sensor node 402 is a pair node of the first sensor node 401, and the fifth sensor node 405 is a pair node of the fourth sensor node 404. The third sensor node 403 does not have a pair node.

The first sensor node 401 senses or collects first sensing information d1 and transmits the collected sensing information d1 to a corresponding sensor node that is the second sensor node 402 through a wireless link. At the same time, the second sensor node 402 senses information and transmits the sensing information d2 to the first sensor node 401 through a wireless link.

The first and second sensor nodes 401 and 402 may use an infrared data association (IrDA) to transmit and receive information to/from each other through a wireless link.

When the first and second sensor nodes 401 and 402 use the IrDA, the IrDA of the first sensor node 401 must face the IrDA of the corresponding pair node which is the second sensor node 402 to transmit/receive information to/from each other.

The third sensor node 403 senses third sensing information d3 and transmits the third sensing information d3 to the first parent node 406. Since the third sensor node 403 does not have a pair node, the third sensor node 403 transmits only third sensing information d3 sensed by oneself to the first parent node 406.

The first parent node 406 transmits the sensing information d1, d2, and d3, which are received from the first, second, and third sensor nodes 401, 402, and 403, to the sink node 408.

The fourth sensor node 404 senses fourth sensing information d4 and transmits the sensing information d4 to a corresponding pair node that is the fifth sensor node 405 through a wireless link. At the same time, the fifth sensor node 405 senses fifth sensing information d5 and transmits the fifth sensing information d5 to the fourth sensor node 404 through a wireless link.

The fourth and fifth sensor nodes 404 and 405 use the same method of the first and second sensor nodes 401 and 402 to transmit/receive information d4 or d5 to/from each other. That is, the fourth sensor node 404 and the fifth sensor node 405 use an infrared data association (IrDA) to transmit/receive information d4 or d5 to/from each other.

The fourth sensor node 404 transmits the fourth sensing information d4 sensed by oneself and the fifth sensing information d5 sensed by the fifth sensor node 405 to the second parent node 407. At the same time, the fifth sensor node 405 transmits the fifth sensing information d5 sensed by oneself and the fourth sensing information d4 sensed by the fourth sensor node 404 to the second parent node 407.

The second parent node 407 transmits the fourth and fifth sensing information d4 and d5 from the fourth and fifth sensor nodes 404 and 405 to the sink node 408.

The first sensor node 401 or the second sensor node 402, the third sensor node 403, and the fourth sensor node 404 or the fifth sensor node 405 may sense information at the same time, regardless of an order of describing the sensor nodes.

However, since the second sensor node 402 is the pair node of the first sensor node 401, the times of sensing information at the first and second sensor nodes 401 and 402 must be the same, and the sensing information sensed by the first and second sensor nodes 401 and 402 must also be the same.

Furthermore, the times of transmitting the sensing information d1 and d2 to the fist parent node 406 at the first and second sensor nodes 401 and 402 must be the same.

Since the fifth sensor node 405 is the pair node of the fourth sensor node 404, the times of sensing the information at the fifth and fourth sensor nodes 404 and 405 must be the same, and the sensing information sensed by the fourth and fifth sensor nodes 404 and 405 must also be the same.

Furthermore, the times of transmitting sensing information to the second parent node 407 at the fourth and fifth sensor nodes 404 and 405 must be the same.

The third sensor node 403 that does not have a pair node transmits the third sensing information d3 using an initially setup message format of a wireless sensor network when the third sensor node 403 transmits the third sensing information d3 to the first parent node 406.

However, the first sensor node 401 or the second sensor node 402 adds predetermined bytes into the initially setup message format to transmit the sensing information d1 and d2 to the first parent node 406 because the first and second sensor nodes 401 and 402 need a message format having a larger capacity.

Following Table 3 shows a message format used by the first sensor node 401 to transmit information to the first parent node 406. As shown, the message format includes a sensing information field 9 for storing sensing information by the first sensor node 401 and transmitted to the first parent node 406, a sensor node ID 10 for storing an own ID, and a destination node ID field 11 for storing an ID of a destination node of a message packet, for example, the ID of the sink node 408.

TABLE 3

| Destination ID 11 | Sensor node ID 10 | Sensing information 9 |
| --- | --- | --- |

The message format according to the present embodiment is only an example. Therefore, it is also obvious to those skilled in the art that the present invention is not limited thereto, and that various message formats may be used.

The message formats used by the second sensor node 402, the fourth sensor node 404, and the fifth sensor node 405 are identical to the message formatted used by the first sensor node 401.

Figure 5:
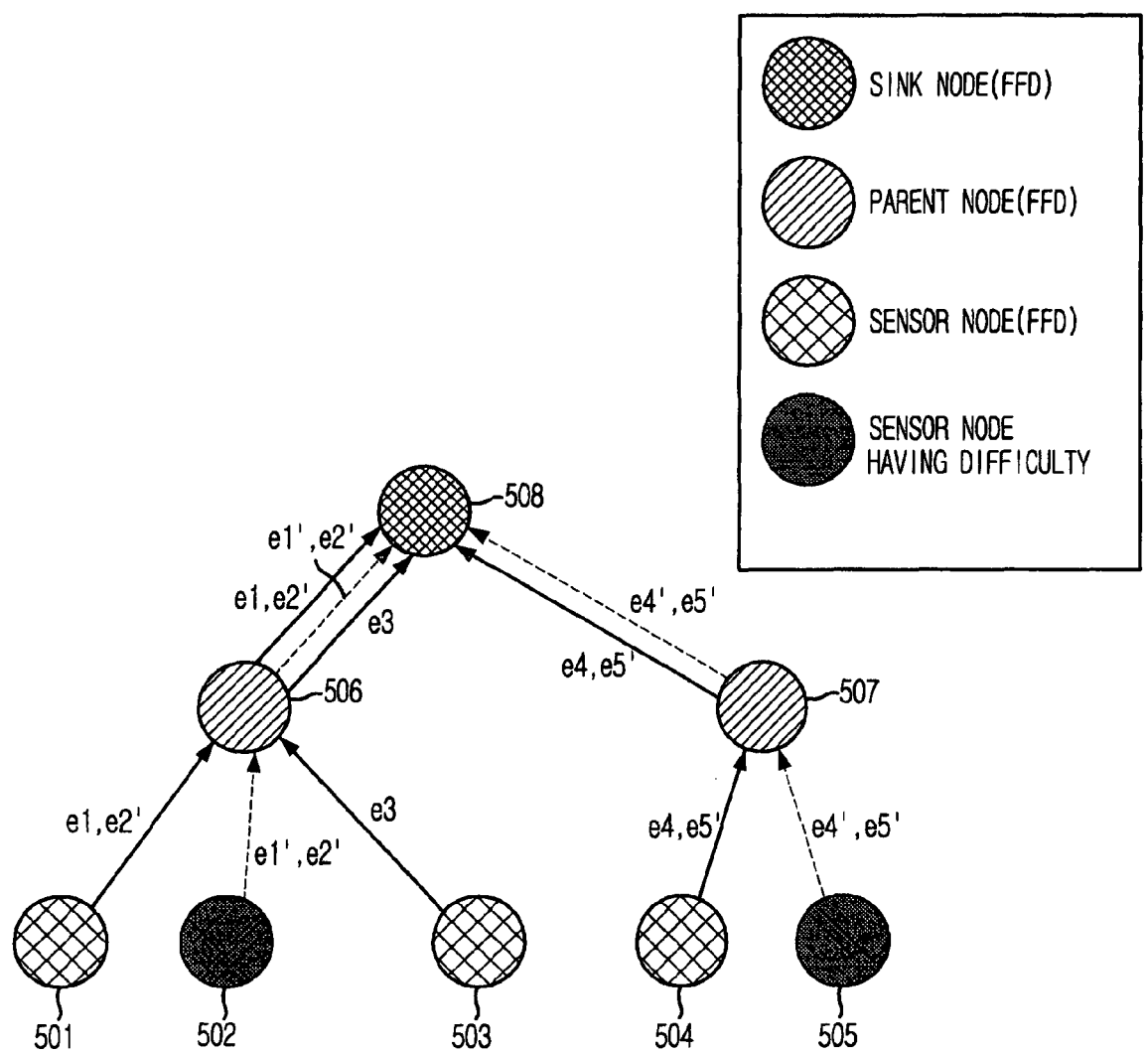
FIG. 5 is a diagram illustrating the determination of the difficulty of a sensor node in a wireless sensor network including a pair node in accordance with an embodiment of the present invention.

FIG. 5 is a diagram illustrating the determination of the difficulty of a sensor node in a wireless sensor network including a pair node in accordance with an embodiment of the present invention.

As shown in FIG. 5, the wireless sensor network having a pair node according to the present embodiment includes sensor nodes 501 to 505, parent nodes 506 and 507, and a sink node 508.

The second sensor node 502 is a pair of the first sensor node 501, and the fifth sensor node 505 is a pair node of the fourth sensor node 504. The third sensor node 503 does not have a pair node.

It is assumed that the second sensor node 502, the pair node of the first sensor node 501, has difficulty. It is also assumed that the fifth sensor node 505, the pair node of the fourth sensor node 504, has difficulty.

The first sensor node 501 senses first sensing information e1 and transmits the first sensing information e1 to the first parent node 506 or transmits the first sensing information e1 to the corresponding pair node which is the second sensor node 502. At the same time, the second sensor node 502 having difficulty senses information e2' and transmits the second sensing information e2' to the first parent node 506 or the first sensor node 501 through a wireless link.

The second sensing information e2 denotes information that is sensed by the second sensor node 502 when the second sensor node 502 does not have difficulty. On the contrary, the second error sensing information e2' denotes information sensed by the second sensor node 502 when the second sensor node 502 is having difficulty.

The first sensor node 501 transmits the first sensing information e1 sensed by oneself and the second error sensing information e2' sensed by the second sensor node 502 to the first parent node 506. The second sensor node 502 transmits the second error sensing information e2' sensed by oneself and the first sensing information sensed by the first sensor node to the first parent node 506.

Since the second sensor node 502 has difficulty, the second sensor node 502 stores the sensing information e1 transmitted sensor node 501 as the first error sensing information e1'.

The third sensor node 503 senses the third sensing information e3 and transmits the third sensing information e3 to the first parent node 506. The third sensor node 503 transmits only the third sensing information e3 to the first parent node 506 because the third sensor node 503 does not include a pair node.

The first parent node 506 transmits the first sensing information e1 and the second error sensing information e2', which are transmitted from the first sensor node 501, and first error sensing information e1' and the second error sensing information e2', which are transmitted from the third sensor node 503, to the sink node 508.

The fourth sensor node 504 senses information and transmits the fourth sensing information e4 to the second parent node 507 or transmits the fourth sensing information e4 to a corresponding pair node which is the fifth sensing node 505 through a wireless link. At the same time, the fifth sensor node 505 senses information and transmits the fifth error sensing information e5' to the second parent node 507 or transmits the fifth error sensing information e5' to the fourth sensor node 504.

Fifth sensing information e5 is information sensed by the fifth sensor node 505 when the fifth sensor node 505 does not have difficulty, and the fifth error sensing information e5' is information selected by the fifth sensor node 505 when the fifth sensor node 505 has difficulty.

The fourth sensor node 504 transmits the fourth sensing information e4 sensed by oneself and the fifth error sensing information e5' to the second parent node 507. The fifth sensor node 505 transmits the fifth error sensing information e5' sensed by oneself and the fourth sensing information e4 sensed by the fourth sensor node to the second parent node 507.

Since the fifth sensor node 505 has the difficulty, the fifth sensor node 505 stores the fourth sensing information e4 transmitted from the fourth sensor node 504 as the fourth error sensing information e4'.

The second parent node 507 transmits the fourth sensing information e4 and the fifth error sensing information e5', which are transmitted from the fourth sensor node 504, and the fourth error sensing information e4' and the fifth error sensing information e5', which are transmitted from the fifth sensor node 505, to the sink node 508.

The times of sensing information at the first sensor node or the second sensor node 502, the third sensor node 503, and the fourth sensor node 504 or the fifth sensor node 505 may be the same, regardless of the order of describing the sensor nodes.

However, since the second senor node 502 is the pair node of the first sensor node 501, the information sensed by the first and second sensor nodes 501 and 502 and the times of sensing the information at the first and the second sensor nodes 501 and 502 must be the same.

Also, the time of transmitting the second information e1 and e2' from the first sensor node 501 to the first parent node 506 and the time of transmitting the sensing information e1' and e2' from the second sensor node 502 to the first parent node 506 are the same.

Since the fifth sensor node 505 is the pair node of the fourth sensor node 504, the times of sensing information at the fourth and fifth sensor nodes 504 and 505 must be the same.

Furthermore, a time of transmitting the sensing information e4 and e5' at the fourth sensor node 504 to the second parent node 507 must be identical to a time of transmitting the sensing information e4' and e5' at the fifth sensor node 505 to the second parent node 507.

The sink node 508 compares the sensing information e1 and e2' transmitted from the first sensor node 501 with the sensing information e1' and e2' transmitted from the second sensor node 502, and compares the sensing information e4 and e5' transmitted from the fourth sensor node 504 with the sensing information e4' and e5' transmitted from the fifth sensor node 505.

The sink node 508 generates a first sum value A1 by adding up the sensing information e1 and e2, which are transmitted from the first sensor node 501. The sink node 508 also generates a second sum value A2 by adding up the sensing information e1' and e2', which are transmitted from the second sensor node 502. The sink node 508 generates a third sum value A3 by adding up the sensing information e4 and e5', which are transmitted from the fourth sensor node 504, and generates a fourth sum value A4 by adding up the sensing information e4 and e5', which are transmitted from the fifth sensor node 505.

The sink node 508 compares the first sum value A1 with the second sum value A2. If the second sum value A2 is smaller than the first sum value A1, the sink node 508 determines that the second sensor node 502 has difficulty. Also, the sink node 508 compares the third sum value A3 with the fourth sum value A4. If the fourth sum value A4 is smaller than the third sum value A3, the sink node 508 determines that the fifth sensor node 505 has difficulty.

The sensing information sensed by the sensor nodes is expressed as values of voltage and current. The sensing information is processed through an analog to digital converter (ADC) in the sensor node. Therefore, if sensing information selected by two normal sensor nodes are the same, two sensing information values, processed through the ADC, must be the same.

However, since the sensor node having the difficulty cannot sense information normally, the sensing information value of the sensor node having the difficulty is smaller than that of the sensor node having no difficulty.

Figure 6:
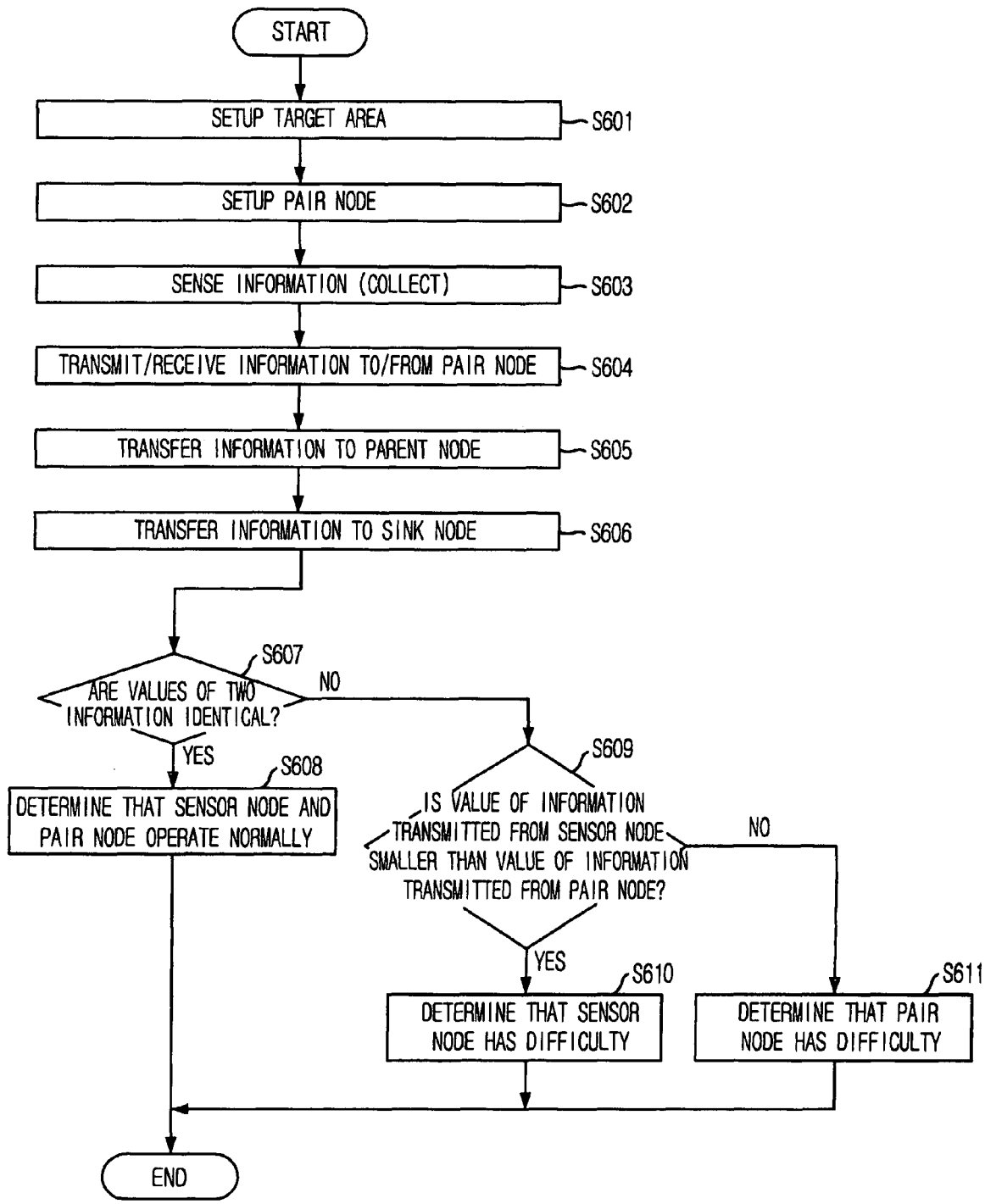
FIG. 6 is a flowchart illustrating a method for determining the difficulties of a sensor node in a wireless sensor network including a pair node in accordance with an embodiment of the present invention.

FIG. 6 is a flowchart illustrating a method for determining the difficulties of a sensor node in a wireless sensor network including a pair node in accordance with an embodiment of the present invention.

Referring to FIG. 5, a target area is set by a sink node at step S601.

At step S602, the sink node sets up a pair node that operates the same function of a sensor node in the set one target area.

The sink node transmits the information about the pair node to the corresponding sensor node, the pair node, and the parent node.

The sensor node and the pair node individually sense information at step S603.

Herein, the information sensed by the sensor node and the pair node are the same.

The sensor node transmits the sensing information to the parent node or the pair node through a wireless link, and the pair node transmits the sensing information to the parent node or the sensor node through a wireless link at step S604.

Then, the sensor node transmits the sensing information sensed by oneself and the sensing information received from the pair node to the parent node. At the same time, the pair node transmits sensing information sensed by the pair node and the information transmitted from the sensor node to the parent node at step S605.

The parent node transmits information from the sensor node and the pair node to the sink node at step S606.

The sink node determines whether the value of information transmitted from the sensor node is identical to the value of information transmitted from the pair node by comparing the value of information transmitted from the sensor node with the value of information transmitted from the pair node at step S607.

If the two values are the same at the step S607, the sink node determines that the sensor node and the pair node operate normally at step S608.

If the two values are not the same at the step S607, the sink node determines whether the value of information transmitted from the sensor node is smaller than the value of information transmitted from the pair node or not at step S609.

If the value of information transmitted from the sensor node is smaller than the value of information transmitted from the pair node, the sink node determines that the sensor node has the difficulty at step S610.

If the value of information transmitted from the sensor node is larger than the value of information transmitted from the pair node, the sink node determines that the pair node has difficulty at step S611.

In the method for transmitting sensing information in a wireless sensor network including a pair node according to the present invention, the difficulty of the sensor node or the pair node can be determined only using the sensing information sensed by the sensor node and the corresponding pair node in the same target area. Since the sensing information is used, an additional cost is not required to determine the difficulty of the sensor node. Therefore, the difficulty of the sensor or the pair node can be effectively and economically determined.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

While the present invention has been described with respect to certain preferred embodiments, it will be apparent to those skilled in the art that various changes and modifications may be made without departing from the spirits and scope of the invention as defined in the following claims.

What is claimed is:

1. A method for transmitting sensing information in a wireless sensor network including a sink node, parent nodes, and sensor nodes set as pair nodes among sensor nodes connected to the parent nodes, comprising the steps of:
   a) setting up predetermined sensor nodes in the same target area as pair nodes for transmitting and receiving sensing information to/from corresponding sensor nodes;
   b) at the pair nodes, transmitting first sensing information sensed by oneself to corresponding sensor nodes;
   c) at the sensor nodes, transmitting first sensing information sensed by oneself and second sensing information transmitted from corresponding pair nodes to the parent node; and
   d) at the parent node, transmitting the received first and second sensing information to the sink node at the same time.

2. The method of claim 1, further comprising the step of:
   e) at the sink node, comparing the first sensing information and the second sensing information, which are transmitted from the pair nodes, and determining that a predetermined sensor node has difficulty if the first sensing information is different from the second sensing information.

3. The method of claim 1, wherein in the step a), the sensor nodes share information about corresponding pair nodes.

4. The method of claim 1, wherein in the step b), the sensor nodes transmits first sensing information sensed by oneself to the corresponding pair nodes through the parent node.

5. The method of claim 4, wherein in the step b), the sensor nodes add a field for indicating a destination of the first sensing information in order to transmit the first sensing information to the corresponding pair node through the parent node.

6. The method of claim 1, wherein in the step b), the sensor nodes directly transmit the first sensing information to corresponding pair nodes.

7. The method of claim 6, wherein in the step b), the sensor nodes transmit the first sensing information to corresponding pair nodes through infrared ray based communication.

8. The method of claim 2, wherein in the step e), the sink node adds the first sensing information and the second sensing information which are transmitted from each of the sensor nodes, and compares the adding results to determine whether a predetermines sensor node has difficulty or not.

9. The method of claim 8, wherein the adding result is expressed as a value of voltage or current, and the voltage values or the current values is compared.

* * * * *